United States Patent
Zhou et al.

(10) Patent No.: US 9,596,154 B2
(45) Date of Patent: Mar. 14, 2017

(54) CLASSIFYING CLIENT DEVICES IN A NETWORK

(71) Applicants: Verizon Patent and Licensing Inc., Basking Ridge, NJ (US); Cellco Partnership, Basking Ridge, NJ (US)

(72) Inventors: Jingyi Zhou, Belle Mead, NJ (US); Lily Hui Zhu, Parsippany, NJ (US); Paul Venizelos, Ridgewood, NJ (US); Christopher M Schmidt, Branchburg, NJ (US); Ashfaq Kamal, Norristown, PA (US); David Geltner, Naperville, IL (US); Robert Bruce Stansell, Winston Salem, NC (US); Mimi K. Tam, Brookline, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 498 days.

(21) Appl. No.: 13/907,597

(22) Filed: May 31, 2013

(65) Prior Publication Data
US 2014/0310398 A1    Oct. 16, 2014

Related U.S. Application Data

(60) Provisional application No. 61/810,999, filed on Apr. 11, 2013.

(51) Int. Cl.
*G06F 15/173* (2006.01)
*H04L 12/26* (2006.01)
*H04L 12/24* (2006.01)

(52) U.S. Cl.
CPC .......... *H04L 43/08* (2013.01); *H04L 41/0893* (2013.01); *H04L 41/085* (2013.01)

(58) Field of Classification Search
CPC ...................................................... H04L 43/08
See application file for complete search history.

(56) References Cited

U.S. PATENT DOCUMENTS

| | | | | |
|---|---|---|---|---|
| 2005/0013316 A1* | 1/2005 | Liao | ..................... | H04L 12/5695 370/449 |
| 2008/0049642 A1* | 2/2008 | Gudipudi | ................ | H04L 41/12 370/254 |
| 2011/0271319 A1* | 11/2011 | Venable, Sr. | ........... | H04L 41/12 726/1 |
| 2012/0221955 A1* | 8/2012 | Raleigh | ................. | H04M 15/00 715/736 |
| 2012/0307798 A1* | 12/2012 | Zhou | ....................... | H04W 4/00 370/331 |
| 2013/0301539 A1* | 11/2013 | Aguirre | ................. | H04W 28/16 370/329 |

* cited by examiner

*Primary Examiner* — Ario Etienne
*Assistant Examiner* — Sahera Halim (57) ABSTRACT

One or more devices may receive attribute information identifying multiple attributes associated with a client device; classify the client device based on the attribute information; and provide, based on classifying the client device, classification information to a network device to cause the network device to associate a particular policy set, of multiple policy sets, with the client device. The classification information may identify a classification of the client device. The particular policy set may be based on the classification of the client device and may include an instruction used to process a data flow provided to or provided from the client device.

20 Claims, 6 Drawing Sheets

Classification Matrix 410

| Device attributes | Classification | | | |
|---|---|---|---|---|
| | Type 1 | Type 2 | Type 3 | Type N |
| | Client support | Client + Access point Support | Access point Support | |
| LAN Connectivity Management | X | X | | |
| Data Collection Function | | | | |
| Control Function | X | | X | |
| Device Management | X | | | |
| Security Management | X | | X | |
| Function AA | | | | |

Classification Policies 420

| Classification | Policy Set | Client Device IDs |
|---|---|---|
| Type 1 | Policy Set 1 | ID 1, ID 2, ID 3 |
| Type 2 | Policy Set 2 | ID 4, ID 5 |
| Type 3 | Policy Set 3 | ID 6 |
| Type 4 | Policy Set 4 | ID 7, ID 8... |
| Type BB | Policy Set CC | |

CLASSIFYING CLIENT DEVICES IN A NETWORK

RELATED APPLICATION

This application claims priority to U.S. Provisional Patent Application No. 61/810,999, filed Apr. 11, 2013, the disclosure of which is incorporated by reference herein.

BACKGROUND

Client devices sometimes communicate with applications (e.g., via a network device) to process data gathered by the client device. A data flow, provided to/from a client device, may be in need of more network resources than another data flow, provided to/from another client device. As such, the network device may overcompensate and provide some data flows with more network resources than needed (thereby increasing network traffic), or undercompensate by providing other data flows with insufficient network resources (thereby causing performance problems in a communication between the client device and an application).

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a technique for a client device (e.g., a machine-to-machine (M2M) device, or some other type of device) to register with a network device in order to facilitate a communication between the client device and an application device (hereinafter referred to as an "app device"). For example, the network device may process a data flow, provided to/from the client device, based on a classification of the client device (e.g., in order to provide the data flow with sufficient network resources without providing the data flow with additional network resources that the data flow may not need).

Figure 1:
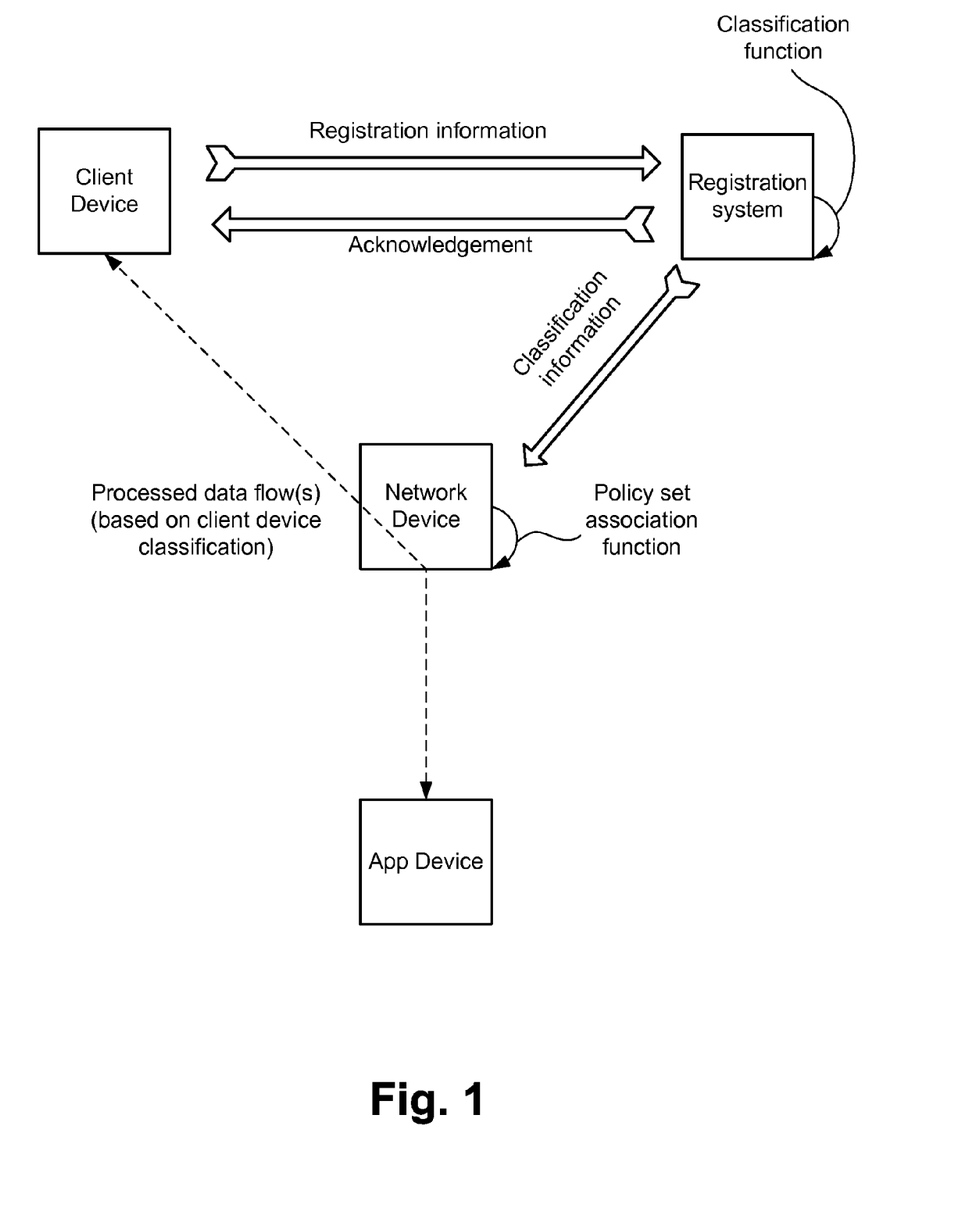
FIG. 1 illustrates an example overview of an implementation described herein.

FIG. 1 illustrates an example overview of an implementation described herein. In some implementations, a client device may be used to communicate with an app device via a network device. In order to facilitate communications between the client device and the app device (and/or to prevent unauthorized access of the app device via an unauthorized client device), a client device may register with the network device such that the network device can associate a set of policies, used to process a data flow, with the client device based on a classification of the client device. For example, as shown in FIG. 1, the client device may provide registration information to a registration system.

In some implementations, the registration information may identify the client device (e.g., based on an identifier of the client device) and/or attributes of the client device. In some implementations, the registration system may receive the registration information and may perform a classification function to classify the client device based on the registration information. As shown in FIG. 1, the registration system may provide classification information to the network device. For example, the registration system may provide a classification identifier (ID) and/or some other information that identifies how the client device is classified.

In some implementations, the network device may receive the classification information and may associate a data flow policy set (hereinafter referred to as a "policy set") for the client device based on the classification of the client device. For example, the network device may store one or more predetermined policy sets that identify how a data flow, received from the client device, is to be processed (e.g., network resources that the data flow may receive).

As shown in FIG. 1, the registration system may provide an acknowledgement to the client device (e.g., when the network device associates a policy set to the client device) to indicate that the client device and the app device may communicate via the network device. For example, the client device may provide a data flow destined for the app device (or the app device may provide a data flow destined for the client device). In some implementations, the network device may receive the data flow and may process the data flow based on the policy set associated with the client device.

As shown in FIG. 1, the network device may process the data flow and provide the data flow to the app device. In some implementations, the app device may provide a data flow, destined for the client device, via the network device such that the network device may process the data flow in accordance with the policy set and provide the processed data flow to the client device.

As described above, the policy set may be based on a classification of the client device. In some implementations, the policy set may be predetermined for each classification to facilitate data flows provided to/from client devices. As a result, the network device may process data flows based on a policy set that is particular to the classification of the client device, thereby increasing efficiency in facilitating communication between the client device and the app device and increasing efficiency in processing data flows. Further, the network device may prevent an unauthorized client device from communicating with the app device (e.g., when the registration system does not store an identifier for the client device).

Figure 2:
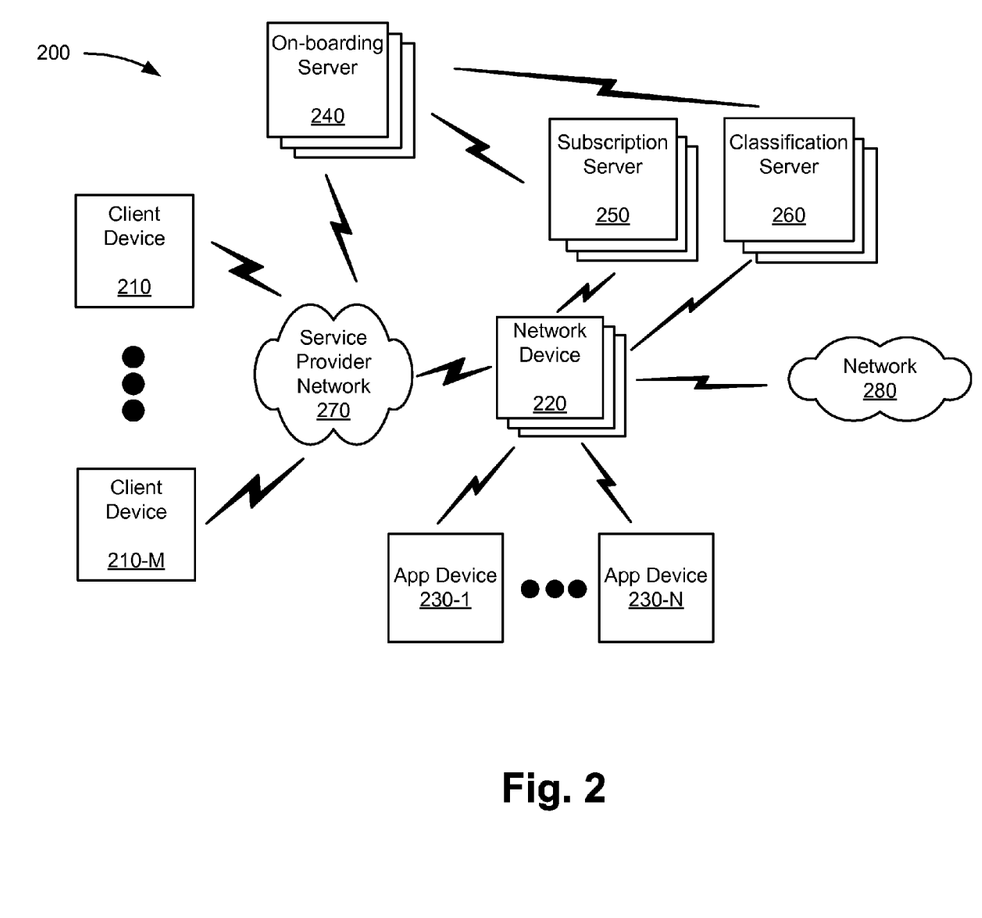
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, . . . , 210-M (where M≥1), network device 220, app devices 230-1 through 230-N (where N≥1), on-boarding server 240, subscription server 250, classification server 260, service provider network 270, and network 280.

Client device 210 may include one or more machine-to-machine (M2M) devices capable of communicating via service provider network 270 and/or network 280. For example, client device 210 may include a network device (e.g., a modem, a switch, a gateway, etc.), a sensing device, a processing device, and/or some other type of device. In some implementations, client device 210 may include a sensing or metering device to gather data (e.g., temperature measurements, resource usage measurements, motion detection, object detection, etc.), a processing device to process the data to form processed data (e.g., via an application implemented on client device 210), and/or a network device to provide a data flow (including the processed data) towards app device 230 (e.g., via network device 220). In some implementations, client device 210 may provide a data flow including a control instruction to another client device 210 (e.g., an instruction to adjust a sensor position/configuration and/or some other type of instruction). In some implementations, client device 210 may include another type of device that gathers, stores, processes, and/or transmits data via service provider network 270 and/or network 280.

Network device 220 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. Network device 220 may, for example, provide connectivity of client device 210 to external packet data networks by being a traffic exit/entry point from/to service provider network 270 for client device 210. Network device 220 may perform policy enforcement, packet filtering, charging support, lawful intercept, and/or packet screening. In some implementations, network device 220 may store one or more policy sets for corresponding classifications of client device 210 and may associate a particular network device 220 with a particular policy set. In some implementations, network device 220 may facilitate communication between client device 210 and app device 230 by processing data flows in accordance with a policy set associated with client device 210 (e.g., based on the classification of client device 210).

In some implementations, network device 220 may perform data proxy communication functions (real time and scheduled) device and application management functions, policy filter provisioning functions, subscriber provisioning functions, application provisioning functions, user subscriber provisioning functions, application name provisioning functions, device hardware ID provisioning functions, classification provisioning functions, and/or some other type of provisioning function. In some implementations, network device 220 may also perform internal query/validation functions, such as user subscription validation, client device 210 class validation, application data transmission state tracking, and/or some other type of network related function.

App device 230 may include a computing device, such as a server device, a desktop computing device, a portable computing device (e.g., a laptop, a tablet, a mobile phone, etc.), an M2M device, and/or some other type of computing device. In some implementations, app device 230 may include one or more applications that receive a data flow, originated from client device 210 (e.g., a data flow having data gathered by a sensor device of client device 210), and may perform a task based on the data flow. For example, app device 230 may perform a data analysis based on the data flow, such as a temperature trends analysis, an inventory analysis, a sales trend analysis, etc. In some implementations, app device 230 may provide a control instruction to client device 210 (e.g., an instruction to adjust a sensor position/configuration and/or some other type of instruction).

On-boarding server 240 may include one or more computing devices, such as a server device or a collection of server devices. In some implementations, on-boarding server 240 may receive a registration request from client device 210 and may transmit information regarding the registration request to/from network device 220, subscription server 250, and/or classification server 260 in order to register on-boarding server 240 with network device 220 (e.g., to allow network device 220 to associate a particular policy set with a particular network device 220). In some implementations, on-boarding server 240 may provide an acknowledgement to client device 210 when the network device 220 has registered client device 210 to allow client device 210 and app device 230 to communicate via network device 220.

Subscription server 250 may include one or more computing devices, such as a server device or a collection of server devices. In some implementations, subscription server 250 may store subscription information for client devices 210. For example, subscription server 250 may store information that uniquely identifies client devices 210 that are subscribed to service provider network 270 and/or authorized to register with network device 220. For example, subscription server 250 may store a hardware identifier (ID), a network access ID, and/or some other information to uniquely identify client device 210. In some implementations, subscription server 250 may validate an ID of client device 210 (e.g., when subscription server 250 stores the ID of client device 210) in order to authorize client device 210 to register with network device 220.

Classification server 260 may include one or more computing devices, such as a server device or a collection of server devices. In some implementations, classification server 260 may store one or more classification matrices and/or classification rules. In some implementations, classification server 260 may classify client device 210 based on a classification profile (e.g., attributes) associated with client device 210. In some implementations, classification server 260 may provide information identifying a classification of client device 210 to network device 220 (e.g., via on-boarding server 240) to allow network device 220 to associate a policy set with client device 210 based on the classification of client device 210.

Service provider network 270 may include one or more wired and/or wireless networks via which client devices 210 and/or app devices 230 communicate and/or receive content. For example, service provider network 270 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another type of network. Additionally, or alternatively, service provider network 260 may include a wide area network (WAN), a metropolitan area network (MAN), an ad hoc network, an intranet, a fiber optic-based network, and/or a combination of these or other types of networks.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections. In some implementations, functions described as being performed by one device may be performed by multiple devices (e.g., to meet capacity demands). Also, devices in environment 200 may be implemented in various geographic locations (e.g., to comply with regulatory requirements/laws associated with a geographic location).

Figure 3:
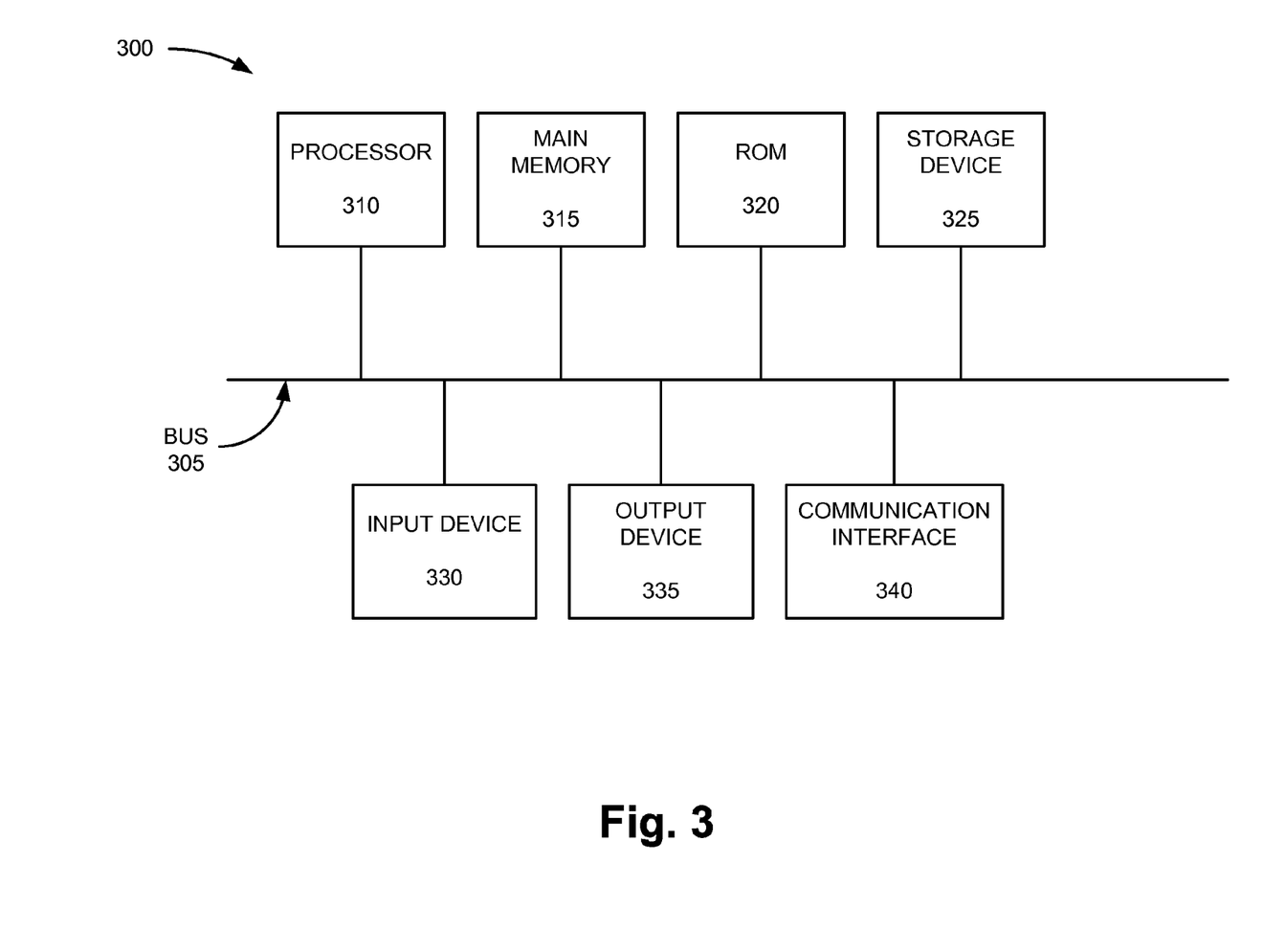
FIG. 3 illustrates example components of a device that may be used within the environment of FIG. 2.

FIG. 3 illustrates example components of a device 300 that may be used within environment 200 of FIG. 2. Device 300 may correspond to client device 210, network device 220, app device 230, on-boarding server 240, subscription server 250, and/or classification server 260. Each of client device 210, network device 220, app device 230, on-boarding server 240, subscription server 250, and/or classification server 260 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, a sensor, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
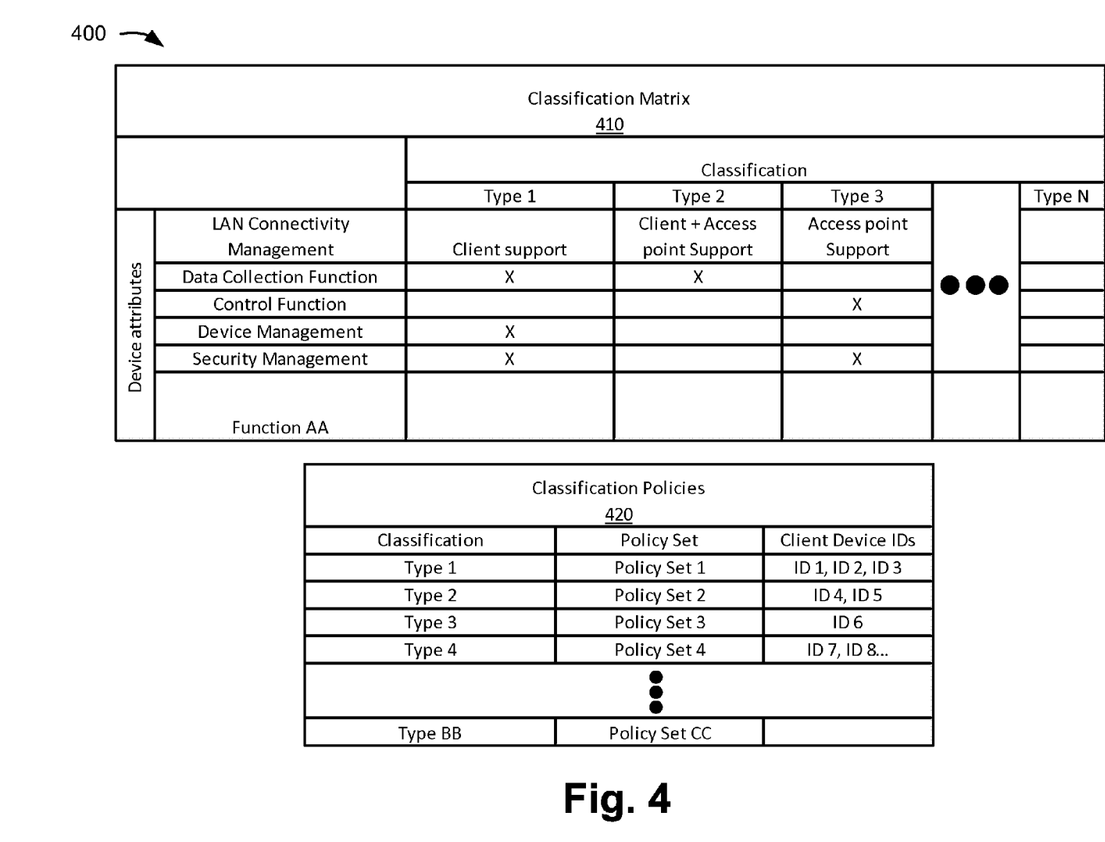
FIG. 4 illustrates an example data structure that may be stored by one or more devices in the environment of FIG. 2.

FIG. 4 illustrates an example data structure 400 that may be stored by one or more devices in environment 200. In some implementations, data structure 400 may be stored in a memory of network device 220 and/or classification server 260. In some implementations, data structure 400 may be stored in a memory separate from, but accessible by network device 220 and/or classification server 260. In some implementations, data structure 400 may be stored by some other device in environment 200, such as app device 230, on-boarding server 240, and/or subscription server 250.

A particular instance of data structure 400 may contain different information and/or fields than another instance of data structure 400. In some implementations, classification server 260 may classify client device 210 based on information stored by data structure 400. Additionally or alternatively, network device 220 may identify a policy set to associate with client device 210 based on information stored by data structure 400.

As shown in FIG. 4, data structure 400 may include classification matrix field 410 and classification policies field 420.

Classification matrix field 410 may store information that identifies one or more classifications associated with corresponding device attributes. For example, classification matrix field 410 may store a classification, such as a "type 1" classification. Further, classification matrix field 410 may store attributes that define the "type 1" classification for client devices 210. As shown in FIG. 4, client devices 210 having the "type 1" classification may have particular attributes, such as client support LAN connectivity management, data collection functionality, device management functionality, and security management functionality. As shown in FIG. 4, other classifications may be associated with a different set of attributes.

In some implementations, classification server 260 may classify client device 210 based on receiving information identifying attributes of client device 210 and based on information stored by classification matrix field 410. For example, assume that client device 210 has particular attributes, such as client support LAN connectivity management, data collection functionality, device management functionality, and security management functionality. Further, assume that classification matrix field 410 identifies a "type 1" classification for client devices 210 having a client support LAN connectivity management attribute, a data collection functionality attribute, a device management functionality attribute, and a security management functionality attribute. Further, assume that classification server 260 receives information identifying the attributes of client device 210. Given these assumptions, classification server 260 may classify client device 210 as a "type 1" classification device.

While a particular list of attributes is illustrated in classification matrix field 410, in practice, classification matrix field 410 may store additional or fewer attributes. For example, classification matrix field 410 may store attributes that identify functions, hardware configurations, software configurations, IP addresses, geographic locations, and/or some other attribute associated with a particular classification.

Classification policies field 420 may store information that identifies policy sets corresponding to classification types. As described above, network device 220 may associate a policy set with client device 210 based on a classification of client device 210. In some implementations, network device 220 may identify a particular policy set to associate with client device 210 having a particular classification based on information stored by classification policies field 420. As shown in FIG. 4, classification policies field 420 may store information that identifies particular client devices 210 associated with a particular classification type and a particular policy set. For example, classification policies field 420 may store an identifier of client device 210 (and/or some other information to uniquely identify client device 210) in connection with a corresponding classification and/or a corresponding policy set.

In some implementations, network device 220 may determine a policy set to use when processing a data flow provided to/from client device 210 based on information stored by classification policies field 420. For example, network device 220 may determine an ID of client device 210 based on a session between client device 210 and network device 220 and may determine a corresponding policy set for the ID. In some implementations, a policy set may be based on some other factor (e.g., instead of or in addition to being based on a classification of client device 210), such as a geographic location and/or an IP address associated with client device 210.

In some implementations, a policy set may include a quality of service (QoS) policy, such as a guaranteed bit rate (GBR), a latency value, a jitter value. Additionally or alternatively, the policy set may include an instruction to provide a particular service to a data flow (e.g., a firewall service, a routing service, a packet-inspection service, a virus scanning service, etc.). Additionally or alternatively, the policy set may include an instruction to provide a data flow to client device 210 via a particular network interface or via a particular protocol (e.g., via a particular routing protocol and/or a particular security protocol). Additionally or alternatively, the policy set may include one or more protocols that network device 220 may use to transmit the data flow. Additionally or alternatively, the policy set may include a resource and/or a particular app device 230 that client device 210 may access. Additionally or alternatively, the policy set may include another type of policy or instruction.

As described above, a particular policy set may be associated with a particular client device 210 based on the classification of client device 210. The particular policy set may be particular to the classification such that data flows, provided to/from client device 210, are processed in accordance with the particular policy set (e.g., to increase efficiency in facilitating communication between client devices 210 and app devices 230). For example, a policy set for a type 1 type client device 210 (e.g., a client device that includes a video camera and a single application to capture audio/video data) may include policies that direct network device 220 to process data flows provided to/from client device 210 more efficiently than if network device 220 were to process the data flows using a policy set for a type 2 type client device 210 (e.g., a client device that includes multiple applications, multiple network interfaces, and/or multiple sensors).

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
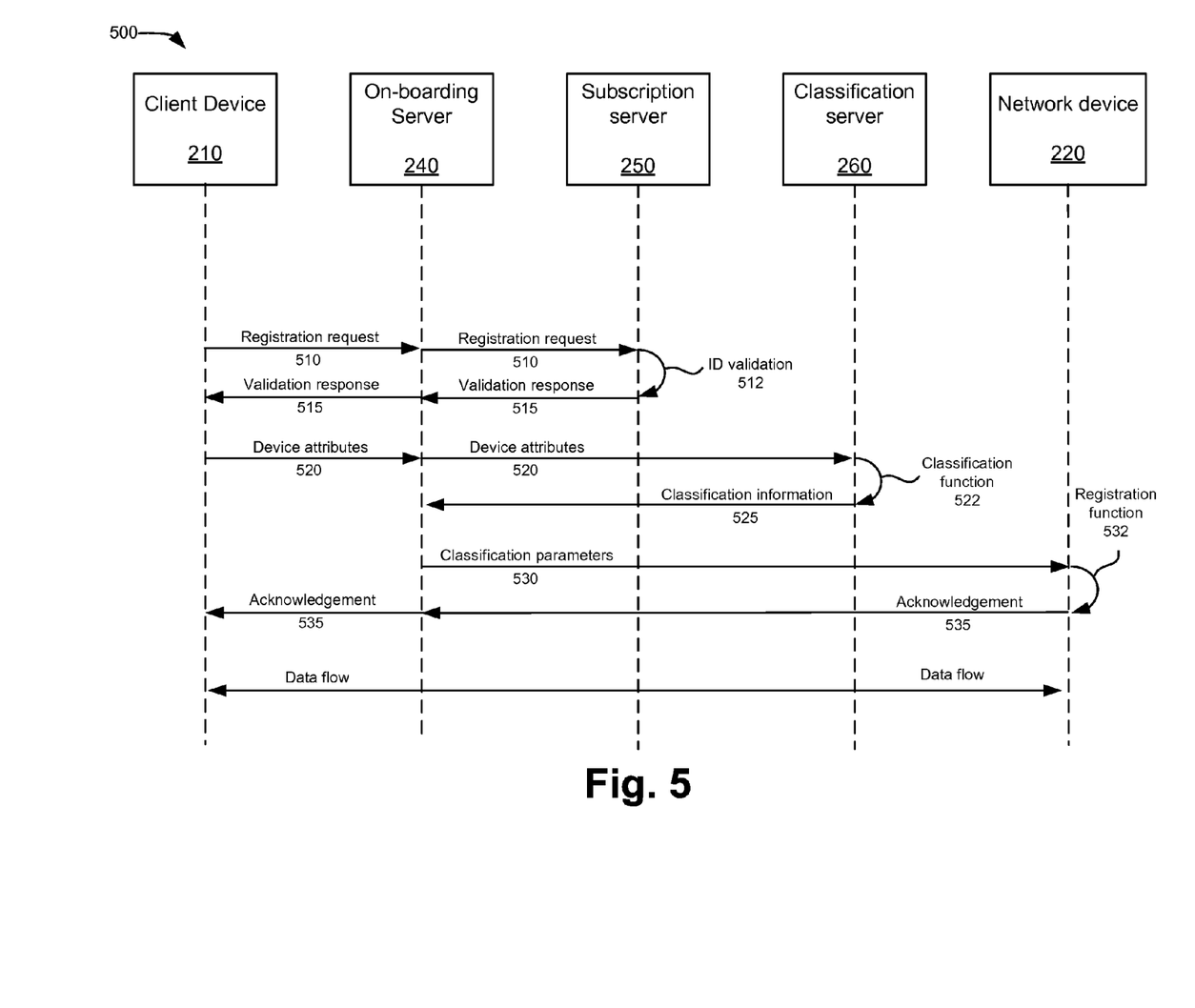
FIG. 5 illustrates a call flow diagram of example operations capable of being performed by an example portion of the environment of FIG. 2.

FIG. 5 illustrates a call flow diagram of example operations capable of being performed by an example portion 500 of environment 200. As shown in FIG. 5, portion 500 may include client device 210, network device 220, on-boarding server 240, subscription server 250, and/or classification server 260. Client device 210, network device 220, on-boarding server 240, subscription server 250, and/or classification server 260 may include components and/or perform functions described above in connection with, for example, one or more of FIGS. 1-3. FIG. 5 may correspond to example operations to register client device 210 with network device 220 based on classification information and/or subscription information, associated with client device 210. In FIG. 5, assume that client device 210 is authorized to connect to service provider network 270.

In some implementations, client device 210 may provide registration request 510 to on-boarding server 240. For example, client device 210 may include an instruction to provide registration request 510 to on-boarding server 240 when client device 210 connects to service provider network 270 (e.g., as part of an initial setup process for client device 210). Additionally or alternatively, client device 210 may provide registration request 510 when client device 210 provides a data flow towards app device 230. For example, assume that client device 210 is not registered with network device 220. Given this assumption, network device 220 may receive the data flow, determine that client device 210 is not registered with network device 220, and provide an instruction to direct client device 210 to provide registration request 510.

In some implementations, registration request 510 may include an identifier (ID) of client device 210, such as a device ID, a media access control (MAC) address, a network access ID, a telephone number, and/or some other information that uniquely identifies client device 210. As shown in FIG. 5, on-boarding server 240 may provide registration request 510 (e.g., on behalf of client device 210) to subscription server 250. In some implementations, subscription server 250 may perform ID validation function 512 to validate the ID included in registration request 510. For example, subscription server 250 may look up the ID of client device 210 in a data structure, associated with subscription server 250, to determine whether client device 210 is subscribed to service provider network 270 and/or authorized to register with network device 220. In some implementations, subscription server 250 may determine that subscription server 250 is authorized to register with network device 220 when subscription server 250 stores the ID of client device 210. In FIG. 5, assume that subscription server 250 stores the ID of client device 210. Given this assumption, subscription server 250 may provide validation response 515 to client device 210 (e.g., via on-boarding server 240) to indicate that client device 210 is authorized to register with network device 220.

In some implementations (e.g., when client device 210 receives validation response 515), client device 210 may provide device attributes 520 to classification server 260

(e.g., via on-boarding server 240). In some implementations, device attributes 520 may include information that identifies hardware, software, functions, and/or network interfaces implemented by client device 210. For example, attributes 520 may include a hardware profile that identifies hardware components implemented by client device 210 (e.g., processor information, storage information, memory information, sensor information, etc.). Additionally or alternatively, attributes 520 may include a software profile that identifies software implemented by client device 210 (e.g., software/application information, middleware information, etc.).

Additionally or alternatively, attributes 520 may include information identifying functions performed by client device 210 (e.g., connection management functions, data collection functions, control functions, device management functions, security management functions, etc.). Additionally or alternatively, attributes 520 may include information identifying applications with which client device 210 communicates (e.g., applications implemented by app device 230). Additionally or alternatively, device attributes 520 may include an IP address and/or a geographic location associated with client device 210. Additionally or alternatively, device attributes 520 may include usage information of client device 210 (e.g., an amount of network resources used by client device 210). Additionally or alternatively, attributes 520 may include some other information that identifies features, functions, components, and/or elements of client device 210.

As shown in FIG. 5, classification server 260 may receive device attributes 520 and may perform classification function 522 to classify client device 210 based on device attributes 520. For example, classification server 260 may store a classification matrix and may apply device attributes 520 to the classification matrix to classify client device 210. Examples of classifying client device 210 based on the classification matrix and based on device attributes 520 are described above with respect to classification matrix field 410. In some implementations, classification server 260 may provide classification information 525 to on-boarding server 240 based on performing classification function 522 to classify client device 210. In some implementations, classification information 525 may identify a classification of client device 210. For example, classification information 525 may include a classification ID that corresponds to a particular classification (e.g., a "type 1" classification, a "type 2 classification", a "multiple application" classification, a "single application" classification, a "sensor-specific" classification, and/or some other type of classification).

In some implementations, on-boarding server 240 may receive classification information 525 and may provide classification parameters 530 to network device 220. In some implementations, classification parameters may include classification information 525 in addition to an ID of client device 210. As shown in FIG. 5, network device 220 may receive classification parameters 530 and may perform registration function 532 to register client device 210 and to associate a policy set to client device 210. For example, as described above with respect to classification policies field 420, network device 220 may store information that identifies a policy set to associate with client device 210 based on the classification of client device 210. In some implementations, network device 220 may identify a particular policy set, associated with the classification of client device 210 (e.g., based on information included in classification parameters 530), and may associate the ID of client device 210 with the particular policy set. For example, network device 220 may store the ID of client device 210 in a row of classification policies field 420 corresponding to the particular policy set and/or corresponding to the classification of client device 210. In some implementations, network device 220 may provide acknowledgement 535 to client device 210 (e.g., via on-boarding server 240) to indicate that client device 210 is registered with network device 220 and that client device 210 may communicate with app device 230 via network device 220.

As shown in FIG. 5, network device 220 may provide a data flow (e.g., a data flow associated with a communication between client device 210 and app device 230) to/from client device 210 based on registering client device 210. In some implementations, network device 220 may process the data flow in accordance with the policy set associated with client device 210. For example, network device 220 may determine an ID of client device 210, based on a session between client device 210 and network device 220, and may determine a corresponding policy set for the ID (e.g., based on information stored by classification policies field 420). As a result, network device 220 may process data flows based on a policy set that is particular to the classification of client device 210, thereby increasing efficiency in facilitating communication between client device 210 and app device 220 and increasing efficiency in processing data flows.

While a particular series of operations and/or data flows have been described above with regards to FIGS. 5, the order of the operations and/or data flows may be modified in other implementations. Further, non-dependent operations may be performed in parallel. Also, in some implementations, some of the operations and/or data flows may be omitted.

Figure 6:
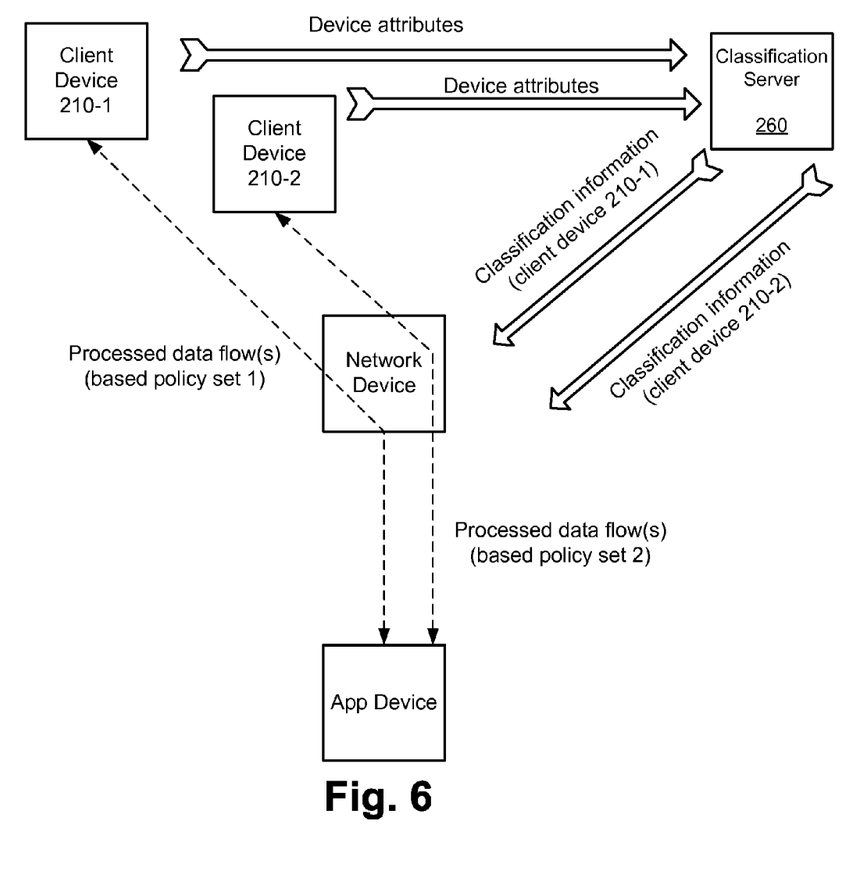
FIG. 6 illustrates an example implementation as described herein.

FIG. 6 illustrates an example implementation as described herein. As shown in FIG. 6, client devices 210-1 and 210-2 may each provide respective sets of device attributes to classification server 260 (e.g., in accordance with operations described above with respect to FIG. 5). In some implementations, classification server 260 may classify client devices 210-1 and 210-2 based on the respective set of device attributes. In FIG. 6, assume that client device 210-1 and client device 210-2 include different device attributes (e.g., different hardware/software configurations, applications, functions, etc.). Given this assumption, classification server 260 may classify client devices 210-1 and 210-2 differently. As shown in FIG. 6, classification server 260 may provide classification information to network device 220 (e.g., via on-boarding server 240). For example, classification server 260 may provide a classification ID for client device 210-1 and a classification ID for client device 210-2 to network device 220. In some implementations, network device 220 may associate a first policy set with client device 210-1 (e.g., based on the classification ID for client device 210-1) and may associate a second policy set with client device 210-2 (e.g., based on the classification ID for client device 210-2).

As shown in FIG. 6, network device 220 may process a data flow, provided to/from, client device 210-1 based on the first policy set, and may process a data flow, provided to/from client device 210-2, based on the second policy set. For example, network device 220 may determine an ID of client device 210-1 to uniquely identify client device 210-1 based on a session between network device 220 and client device 210-1. As described above, network device 220 may look up the ID of client device 210-1 to identify the first policy set and process the data flow, provided to/from client device 210-1, based on the first policy set. In a similar manner, network device 220 may determine an ID of client device 210-2 to uniquely identify client device 210-2 based on a session between network device 220 and client device 210-2. As described above, network device 220 may look up the ID of client device 210-2 to identify the second policy set and process the data flow, provided to/from client device 210-2, based on the second policy set.

While a particular example is shown in FIG. 6, it will be apparent that the above description is merely an example implementation. Other examples are possible from what is shown in FIG. 6.

As described above, a policy set may be based on a classification of client device 210. In some implementations, the policy set may be predetermined for each classification to facilitate data flows provided to/from client devices 210. As a result, network device 220 may process a data flow based on a policy set that is particular to the classification of client device 210, thereby increasing efficiency in facilitating communication and processing the data flow between client device 210 and app device 230. Further, network device 220 may prevent an unauthorized client device 210 from communicating with app device 230 (e.g., when subscription server 250 does not store an identifier for client device 210).

In some implementations, client device 210 may register with network device 220 based on subscription information stored by subscription server 250 that is located in a particular geographic location substantially remote to the client device 210 and/or app device 230 (e.g., to allow multiple client devices 210, located in various geographic locations, to register with network device 230 to facilitate communication with multiple app devices 230 located in various geographic locations).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by one or more devices, a particular data flow from a client device;
   determining, by the one or more devices and based on receiving the particular data flow, that the client device is not registered;
   providing, by the one or more devices and based on determining that the client device is not registered, a registration instruction for the client device;
   receiving, by the one or more devices and based on providing the registration instruction for the client device, attribute information from the client device,
      the attribute information identifying a plurality of attributes associated with the client device;
   classifying, by the one or more devices, the client device based on the attribute information; and
   providing, by the one or more devices and based on classifying the client device, classification information to a network device to cause the network device to associate a particular policy set, of a plurality of policy sets, with the client device,
      the classification information identifying a classification of the client device,
      the particular policy set being based on the classification of the client device,
      the particular policy set including a processing instruction used to process a data flow, provided to or provided from the client device via a network, using a particular amount of network resources, a particular network interface, a particular network protocol, or a particular quality of service (QoS).

2. The method of claim 1, further comprising:
   receiving, based on providing the registration instruction for the client device, a registration request from the client device,
      the registration request including identification information to uniquely identify the client device;
   authorizing the client device to communicate with the network device based on the identification information; and
   providing, based on authorizing the client device, a response to the client device to indicate that the client device is authorized to communicate with the network device,
      where receiving the attribute information is based on providing the response to the client device.

3. The method of claim 1, where the plurality of attributes identify at least one of a hardware profile, a software profile, a function, a geographic location, or an internet protocol (IP) address of the client device.

4. The method of claim 1, where the processing instruction to process the data flow causes the network device to provide the data flow with the particular amount of network resources.

5. The method of claim 1,
   where the processing instruction to process the data flow causes the network device to provide the data flow with a particular service, and
   where the particular service includes a firewall service, a routing service, a packet-inspection service, or a virus-scanning service.

6. The method of claim 1,
   where the classification information includes an identifier of the client device, and
   where the client device is associated with the particular policy set based on the identifier of the client device.

7. The method of claim 1, further comprising:
receiving an acknowledgement from the network device when the network device associates the particular policy set with the client device; and
providing the acknowledgement to the client device to permit the client device to provide or receive the data flow.

8. The method of claim 1, where the client device is a machine-to-machine (M2M) device that includes at least one of a sensor or an application.

9. A system comprising:
one or more devices to:
receive a particular data flow from a client device;
determine, based on receiving the particular data flow, that the client device is not registered;
provide, based on determining that the client device is not registered, a registration instruction for the client device;
receive, from the client device and based on providing the registration instruction for the client device, attribute information identifying a plurality of attributes associated with the client device,
the client device being separate from the one or more devices;
classify the client device based on the attribute information; and
provide, based on classifying the client device, classification information to a network device to cause the network device to associate a particular policy set, of a plurality of policy sets, with the client device,
the classification information identifying a classification of the client device,
the particular policy set being based on the classification of the client device, and
the particular policy set including a processing instruction used to process a data flow provided to or provided from the client device via a network to provide the data flow with a particular amount of network resources, a particular Quality of Service (QoS), or a particular network protocol.

10. The system of claim 9,
where the one or more devices are further to:
receive, based on providing the registration instruction for the client device, a registration request from the client device,
the registration request including identification information to uniquely identify the client device;
authorize the client device to communicate with the network device based on the identification information; and
provide, based on authorizing the client device, a response to the client device to indicate that the client device is authorized to communicate with the network device,
where, when receiving the attribute information, the one or more devices are to:
receive the attribute information based on providing the response to the client device.

11. The system of claim 9, where the plurality of attributes identify at least one of a hardware profile, a software profile, a function, a geographic location, or an internet protocol (IP) address of the client device.

12. The system of claim 9,
where the classification information includes an identifier of the client device, and
where the client device is associated with the particular policy set based on the identifier of the client device.

13. The system of claim 9, where the one or more devices are further to:
receive an acknowledgement from the network device when the network device associates the particular policy set with the client device; and
provide the acknowledgement to the client device to permit the client device to provide or receive the data flow.

14. The system of claim 9, where the client device is a machine-to-machine (M2M) device that includes at least one of a sensor or an application.

15. A non-transitory computer-readable medium for storing instructions, the instructions comprising:
a plurality of instructions which, when executed by one or more processors, cause the one or more processors to:
receive a particular data flow from a client device;
determine, based on receiving the particular data flow, that the client device is not registered;
provide, based on determining that the client device is not registered, a registration instruction for the client device;
receive, from the client device and based on providing the registration instruction for the client device, attribute information identifying a plurality of attributes associated with the client device,
the client device being separate from the one or more processors;
classify the client device based on the attribute information; and
provide, based on classifying the client device, classification information to a network device to cause the network device to associate a particular policy set, of a plurality of policy sets, with the client device,
the classification information identifying a classification of the client device and an identifier of the client device,
the particular policy set being based on the classification of the client device, and
the particular policy set including a processing instruction used to process a data flow, provided to or provided from the client device via a network, using a particular network interface, a particular network protocol, or a particular quality of service (QoS).

16. The non-transitory computer-readable medium of claim 15, where the plurality of instructions further cause the one or more processors to:
receive, based on providing the registration instruction for the client device, a registration request from the client device,
the registration request including identification information to uniquely identify the client device;
authorize the client device to communicate with the network device based on the identification information; and
provide, based on authorizing the client device, a response to the client device to indicate that the client device is authorized to communicate with the network device,
where one or more instructions, of the plurality of instructions, to receive the attribute information, cause the one or more processors to receive the attribute information based on providing the response to the client device.

17. The non-transitory computer-readable medium of claim 15, where the plurality of attributes identify at least one of a hardware profile, a software profile, a function, a geographic location, or an interne protocol (IP) address of the client device.

18. The non-transitory computer-readable medium of claim 15, where the processing instruction to process the data flow causes the network device to provide the data flow with a particular network resource.

19. The non-transitory computer-readable medium of claim 15, where the processing instruction to process the data flow causes the network device to provide the data flow with a particular service.

20. The non-transitory The computer-readable medium of claim 15, where the client device is a machine-to-machine (M2M) device that includes at least one of a sensor or an application.

* * * * *